United States Patent
Ham et al.

(10) Patent No.: US 12,376,638 B2
(45) Date of Patent: Aug. 5, 2025

(54) FACILITATING DESIGNING OF GARMENT BY DUPLICATING PATTERN PIECE IN THREE-DIMENSIONAL SPACE

(71) Applicant: CLO Virtual Fashion Inc., Seoul (KR)

(72) Inventors: Hyung Gi Ham, Seoul (KR); Jae Hwan Ma, Seoul (KR); Tae Wan Jeong, Seoul (KR)

(73) Assignee: CLO Virtual Fashion Inc., Seoul (KR)

( * ) Notice: Subject to any disclaimer, the term of this patent is extended or adjusted under 35 U.S.C. 154(b) by 0 days.

(21) Appl. No.: 18/733,155

(22) Filed: Jun. 4, 2024

(65) Prior Publication Data

US 2024/0341388 A1     Oct. 17, 2024

Related U.S. Application Data

(63) Continuation-in-part of application No. PCT/KR2023/001063, filed on Jan. 20, 2023.

(30) Foreign Application Priority Data

Jan. 20, 2022  (KR) .................. 10-2022-0008476
Jan. 20, 2023  (KR) .................. 10-2023-0008825

(51) Int. Cl.
*A41H 3/00*      (2006.01)
*G06T 19/20*     (2011.01)

(52) U.S. Cl.
CPC ............. *A41H 3/007* (2013.01); *G06T 19/20* (2013.01); *G06T 2219/2024* (2013.01)

(58) Field of Classification Search
CPC .. A41H 3/007; G06T 19/20; G06T 2219/2024

USPC ........................................... 700/132
See application file for complete search history.

(56) References Cited

U.S. PATENT DOCUMENTS 7,657,340 B2 *   2/2010  Lind .............. A41H 3/007
                                                700/130
2021/0227912 A1    7/2021  Ma
2021/0259341 A1 *  8/2021  Lee ............. A41H 3/007
2022/0361612 A1 * 11/2022  Park ............. G06Q 50/04

FOREIGN PATENT DOCUMENTS

| JP | 2000-187683 A | 7/2000 |
| JP | 2014-219754 A | 11/2014 |
| KR | 10-2002-0012332 A | 2/2002 |
| KR | 10-2173900 B1 | 11/2020 |
| KR | 10-2021-0095554 A | 8/2021 |

OTHER PUBLICATIONS

International Search Report of PCT/KR2023/001063 mailed on Apr. 24, 2023.
Written Opinion of International Searching Authority of PCT/KR2023/001063 mailed on Apr. 24, 2023.

* cited by examiner

*Primary Examiner* — Nathan E Durham
(74) *Attorney, Agent, or Firm* — WTA Patents

(57) ABSTRACT

The following disclosure relates to a pattern creation simulation method. The pattern creation simulation method may provide a user interface including a first area that controls a plurality of functions for creating or editing a design of a design product in a three-dimensional (3D) virtual space and a second area in which a plurality of interfaces are switched in response to the plurality of functions.

16 Claims, 20 Drawing Sheets

FACILITATING DESIGNING OF GARMENT BY DUPLICATING PATTERN PIECE IN THREE-DIMENSIONAL SPACE

CROSS-REFERENCE TO RELATED APPLICATIONS

This application is a bypass continuation-in-part application of International PCT Application No. PCT/KR2023/001063, filed on Jan. 20, 2023, which claims priority to Republic of Korea Patent Application No. 10-2022-0008476, filed on Jan. 20, 2022 and Republic of Korea Patent Application No. 10-2023-0008825, filed on Jan. 20, 2023, which are incorporated by reference herein in their entirety.

TECHNICAL FIELD

Embodiments relate to creating or modifying a design, and more specifically to duplicating pattern pieces and setting sewing connections of the duplicated pattern pieces to create the design of the garment.

BACKGROUND ART

A garment appears three-dimensional (3D) when worn by a person, but the garment is more of a two-dimensional (2D) object because it is a combination of pieces of fabric that are cut according to a 2D pattern. Because fabric, that is, a material of a garment, is flexible, the shape of the fabric may vary depending on the body shape or movement of a person wearing the garment. A garment worn on an avatar may be expressed in a 3D space through 3D simulation, but pattern pieces forming the garment are traditionally presented and designed in a 2D format. A person relatively new to a garment designing process find it difficult and awkward to design pattern pieces in the 2D format since the final result of the designing yields a garment in a 3D shape.

Summary of Disclosure

Embodiments relate to automatically setting sewing connections between duplicated pattern piece and a selected pattern piece. A garment including a plurality of pattern pieces is displayed in three-dimensional (3D) virtual space. Selection of a pattern piece of the plurality pattern pieces in the 3D virtual space is received. The selected pattern piece is duplicated responsive to receiving the selection of the pattern piece. Sewing connections between the duplicated pattern piece and the selected pattern piece are automatically set. An input updating a subset of the sewing connections is received to generate an updated garment including the duplicated pattern piece connected to the selected pattern piece. Simulation of the updated garment in the 3D virtual space is performed.

In one or more embodiments, sewing lines extending between an edge of the selected pattern piece to an edge of the duplicated pattern piece to represent the the sewing connections are displayed.

In one or more embodiments, selection of another pattern piece sharing a style line with the selected pattern piece is received. The style line represents a style, a silhouette or both the style and the silhouette of the garment. Sewing lines do not extend between the selected pattern piece and the other selected pattern piece.

In one or more embodiments, a drawing input to draw a style line across at least one of the plurality of pattern pieces is received.

In one or more embodiments, another style line that is symmetrical to the drawn style line is added. The other style line extends across at least another of the plurality of pattern pieces.

In one or more embodiments, a style line is displayed. An editing input to modify the displayed style line is received. The updated garment is modified according to the modified style line.

In one or more embodiments, user interface elements for selecting functions to be performed on the garment or the updated garment are displayed in a first area, and the garment is displayed in a second area separate from the first area.

In one or more embodiments, the user interface elements include at least a first user interface element activating a drawing function for adding a style line in the garment, a second user interface element for editing a length or width of a pattern piece of the garment, and a third user interface element editing a style line in the garment.

In one or more embodiments, one of the first interface element, the second user interface element and the third user interface element is activated at a time.

In one or more embodiments, the plurality of pattern pieces and the duplicated pattern piece are displayed in an exploded view. The sewing connections are represented as sewing lines between edges of the the plurality of pattern pieces and the duplicated pattern piece.

In one or more embodiments, the input updating the subset of the sewing connections is received at lines representing the subset of sewing connections.

In one or more embodiments, the input updating the subset of sewing connections indicates deletion of the lines representing the subset of sewing connections.

BRIEF DESCRIPTION OF DRAWINGS

The teachings of the embodiments may be readily understood by considering the following detailed description in conjunction with the accompanying drawings

DETAILED DESCRIPTION

Figure 1A:
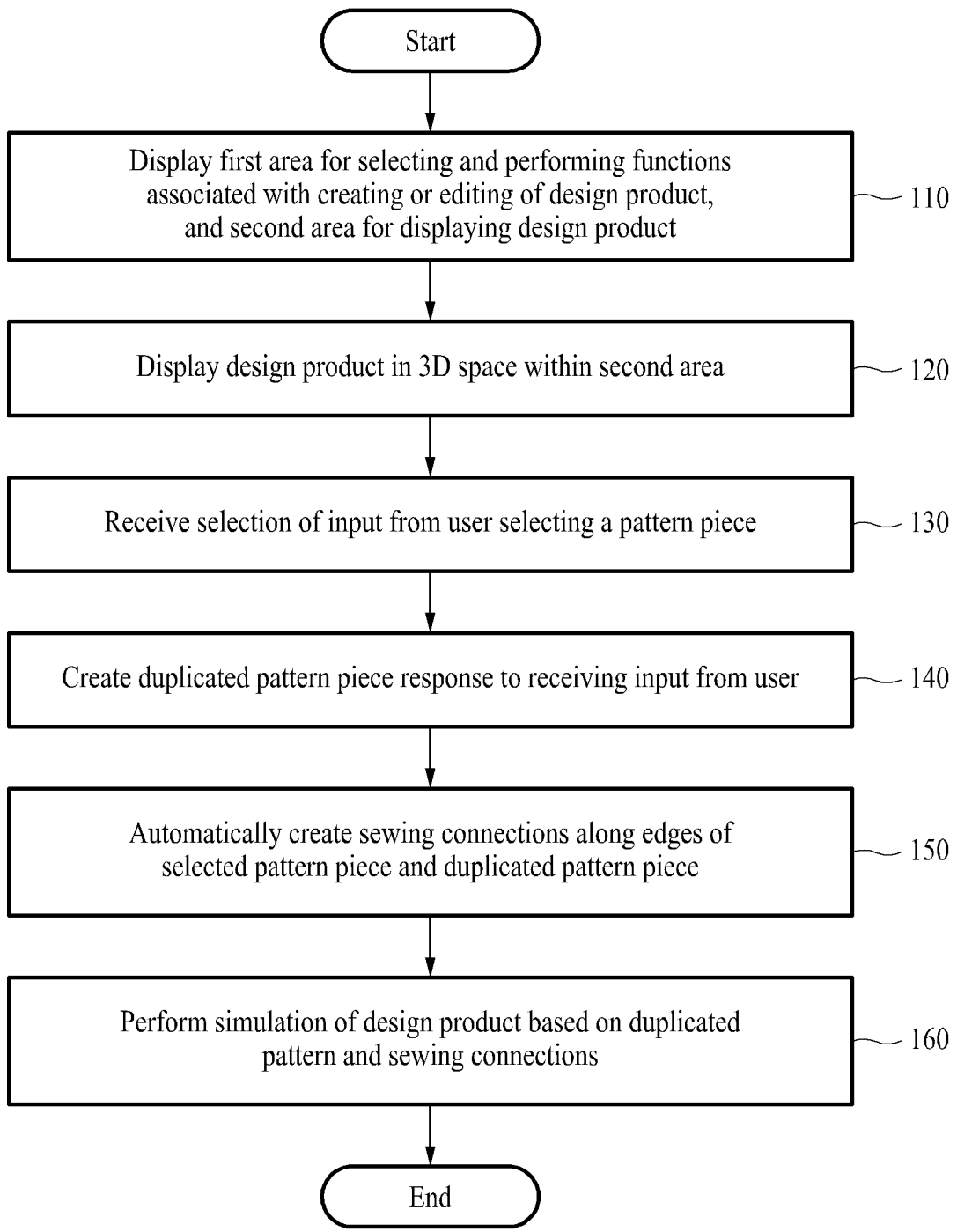
FIG. 1A is a flowchart illustrating a process of creating or modifying a design of a garment and performing simulation on the garment, according to an embodiment.

The following detailed structural or functional description of example embodiments is provided as an example only, and the example embodiments may be implemented in various forms. Accordingly, the example embodiments are not construed as limited to the present disclosure and should be understood to include all changes, equivalents, and replacements within the idea and the technical scope of the present disclosure.

Although terms of "first" or "second" are used to explain various components, these terms should be used only to distinguish one component from another component. For example, a first component may be referred to as a second component, and similarly the second component may also be referred to as the first component.

It should be noted that if it is described that one component is "connected" to another component, a third component may be connected between the first and second components, although the first component may be directly connected to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

As used herein, "A or B", "at least one of A and B", "at least one of A or B", "A, B or C", "at least one of A, B and C", and "at least one of A, B, or C," each of which may include any one of the items listed together in the corresponding one of the phrases, or all possible combinations thereof.

The example embodiments may be implemented as or performed in various types of products, such as, a personal computer (PC), a laptop computer, a tablet computer, a smartphone, a television (TV), a smart home appliance, an intelligent vehicle, a kiosk, and a wearable device.

The following embodiments are described in detail with reference to the accompanying drawings. When describing the example embodiments with reference to the accompanying drawings, like reference numerals refer to like components and a repeated description related thereto will be omitted.

Although not shown in the drawings, three-dimensional (3D) garments and two-dimensional (2D) pattern pieces may be composed of a mesh including a plurality of polygons. According to example embodiments, the mesh may be modeled in various manners. For example, vertices of a polygon included in the mesh may be point masses, and sides of the polygon may be represented as elastic springs which connect the point masses. Thus, the 3D garment according to an example embodiment may be modeled by a mass-spring model. The springs may have respective resistance values against stretch, shear, and bending, depending on a material property of fabric used. Alternatively, the mesh may be modeled by a strain model. A polygon included in the mesh may be modeled, for example, as a triangle or as a polygon having four or more sides. In some examples, in a case of needing to model a 3D volume, the mesh may be modeled as a 3D polyhedron.

The vertices of the polygons included in the mesh may be moved by an external force such as gravity and an internal force such as stretch, shear, and bending. When a force applied to each vertex is obtained by calculating the external force and the internal force, a displacement rate and motion of each vertex may be obtained. Movements of the garment may be simulated through the movements of the vertices of the polygons included in the mesh in each time step. For example, when a garment formed of a polygonal mesh is put on a 3D avatar, it is possible to embody a 3D virtual garment that looks natural based on the laws of physics. The vertices of the polygons included in the mesh may move according to the action of an external force such as gravity and the action of an internal force such as stretch, shear, and bending. When a force applied to each vertex is obtained by calculating the external force and the internal force, a displacement rate and motion rate of each vertex may be obtained. Also, a movement of the virtual garment may be simulated through movements of the vertices of the polygons of the mesh in each time step. When a 2D pattern piece formed of a polygonal mesh is put on a 3D avatar, it is possible to embody a 3D virtual garment that looks natural based on the laws of physics.

The 3D garments according to an example embodiment may include at least one of a virtual garment that fits a user's body measurements, a virtual garment for a 3D virtual character, and a virtual garment for a 3D virtual avatar.

A 3D garment may be created by connecting an outline of a 2D pattern piece to an outline of another 2D pattern piece (e.g., by sewing). Sewing of the 2D pattern pieces may be implemented by attaching a mesh of the 2D pattern piece to a mesh of another 2D pattern piece. More specifically, polygon vertices of the mesh of the 2D pattern piece at the outlines of the two 2D pattern pieces are connected together. The beginning and end of each sewing line are the polygon vertices of the mesh. When the number of polygon vertices on each sewing line input by the user does not match, the mesh of the corresponding 2D pattern piece may be updated to create a new mesh so that the numbers of polygon vertices on two sewing lines coincide, and then the corresponding polygon vertices are welded to form a 3D virtual garment.

A design product described herein refers to an item that is designed by a user. T design product may include garments, shoes, accessories, bags, hats, and the like. A design product may include at least one pattern piece. Taking the example of a T-shirt, the garment may include a front bodice pattern piece, a back bodice pattern piece and two arm sleeve pattern pieces.

Figure 1B:
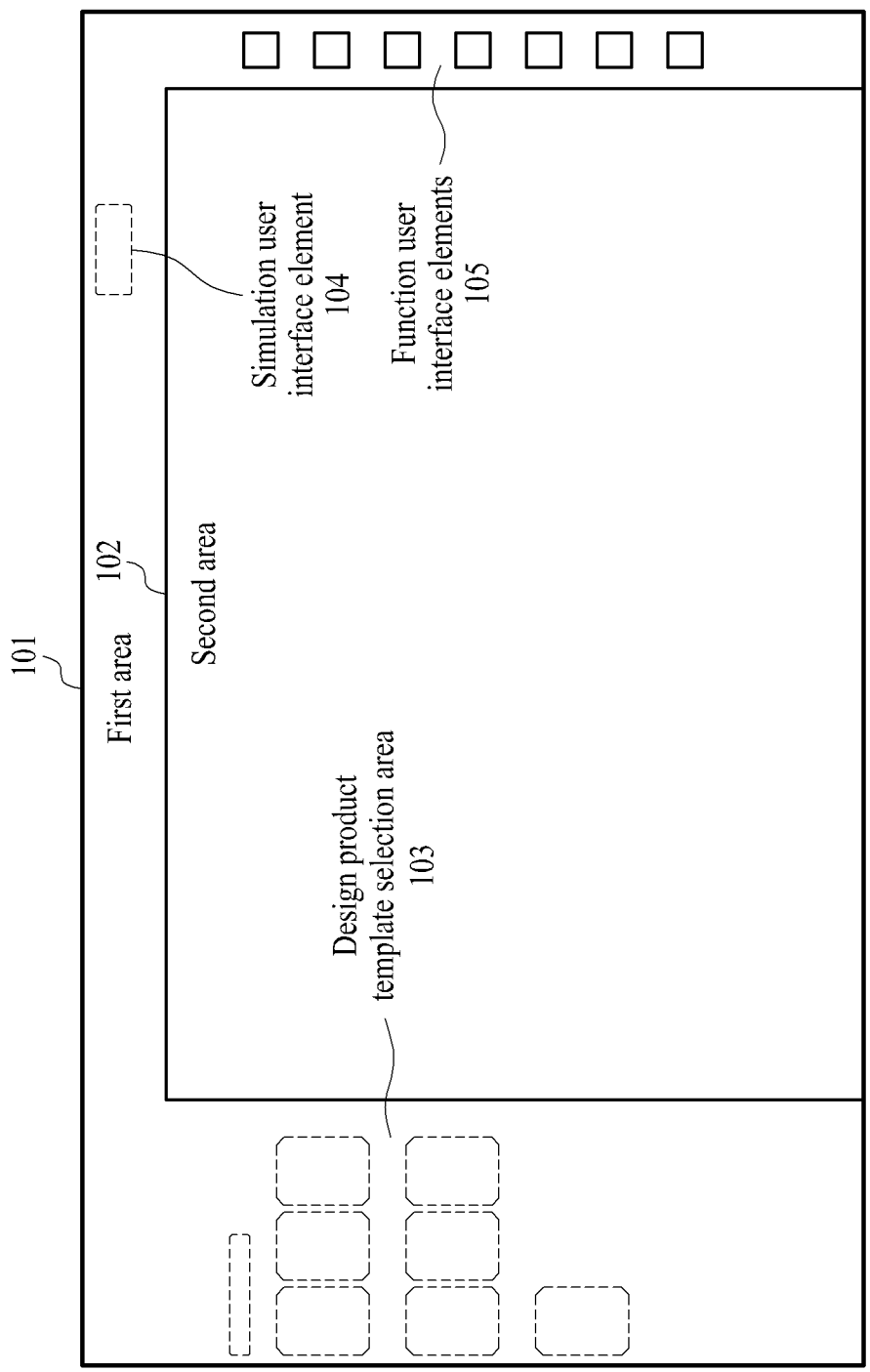
FIG. 1B is a graphical user interface diagram of a screen for creating or modifying the design of the garment, according to an embodiment.

FIG. 1A is a flowchart illustrating a process of creating or modifying a design of a garment and performing simulation on the garment, according to an embodiment. The operations of FIG. 1A and their sequence are merely illustrative. The order of some operations may change and/or some of the operations may be omitted. For example, some of the operations shown in FIG. 1A may be performed in parallel. FIG. 1B is a graphical user interface diagram of a screen for creating or modifying the design of the garment, according to an embodiment.

In operation 110, a simulation device may display first area 101 that enables a user to select and perform a plurality of functions associated with creating or editing a design of a design product (e.g., a garment) in a 3D virtual space, and second area 102 in which interface elements are selectively displayed along with the design product in response to the plurality of functions. The second area 102 may display the design product with or without an avatar according to the user's selection.

In operation 120, the simulation device may display the design product in the 3D virtual space within the second area 102. Initially, user interface elements for creating or modifying the design product, and for performing other functions in the first area 101 are deactivated. Alternatively, a predetermined function (e.g., a style line editing function) may be selected from the first area 101 as a default operation upon initialization of the design process.

The simulation device may display user interface elements for selecting at least one pattern piece (e.g., pattern pieces 910, 921, 922, 930, and 940 of FIGS. 9B and 10A) of the design product displayed in the first area 101. In operation 130, after the user activates the user interface element by choosing the relevant display user interface element, the simulation device may receive input from the user for selecting a pattern piece of the design product in the 3D virtual space, as displayed in the second area 102.

In operation 140, the simulation device creates a duplicated pattern piece (e.g., duplicated pattern pieces 1010, 1030, and 1040 of FIG. 10B) responsive to receiving another input from the user.

In operation 150, the simulation device automatically creates sewing connections (represented by sewing lines) along the edges of the selected pattern piece (e.g., the pattern pieces 910, 930, and 940 of FIG. 9B) and the duplicated pattern piece. For example, the simulation device may create sewing connections on the edge of the selected pattern piece (e.g., the pattern pieces 910, 930, and 940 of FIG. 9B) and an edge of the duplicated pattern piece. The simulation device may exclude a style line shared by the selected pattern pieces from the edge where the sewing connection is automatically created. Pattern piece creation and sewing is described in detail below with reference to FIGS. 4 to 11D.

The simulation device may identify a 2D pattern piece corresponding to the user input and create a 2D duplicated pattern piece corresponding to the identified 2D pattern piece. Although not shown in the drawings, the simulation device may identify data on a 2D pattern piece in a 3D virtual space in real time. Also, when a pattern piece and a duplicated pattern piece are sewn in a 3D virtual space, the simulation device may create sewing connections between the 2D pattern piece and the 2D duplicated pattern piece.

The simulation device may provide, in the second area 102, user interface elements for creating or editing at least one sewing connection related to at least one selected pattern piece and the duplicated pattern piece when a sewing creation or editing function is selected in the first area 101. The simulation device may display the pattern pieces in an exploded view in which pattern pieces of the design product are separated from each other in the 3D virtual space, as described below in detail with reference to FIGS. 11A through 11D. In the simulation device, a sewing connection between the separated pattern pieces in the exploded view may be visualized using sewing lines that extend between the edges of the two pattern pieces to enable the user to edit the sewing connections. In exploded view, distances between pattern pieces may be adjusted to facilitate the user to select correct sewing lines, material, and size conversion for each pattern piece.

According to embodiments, the simulation device allows the user to navigate through different depth levels, as described below in detail with reference to FIG. 6. Depending on depth levels, only certain pattern pieces or garment may be displayed and edited.

The simulation device may also display a style line in the design product to the second area 102, in response to selection of a style line editing function through the first area 101. The style line represents a style, a silhouette or both the style and the silhouette of the design product. Such style line may be a line extending along the junction of two or more pattern pieces connected by sewing, an outline representing a silhouette of the design product, or a cut-out line added to implement a specific appearance of the design product. The beginning and end points of the style line may be a line or a dot on a pattern piece. When a style line is created on a pattern piece, the pattern piece may be automatically divided along the style line internally in the pattern piece, and a pair of sewing lines may be created along the style line.

The simulation device may enable adding of a style line to the design product, as described below in detail with reference to FIG. 9A. The simulation device may also enable adjusting of the length and/or width of a pattern piece of the design product in the second area 102.

In one or more embodiments, a duplicated pattern piece and the original selected pattern piece are automatically connected by sewing along the edges of the duplicated pattern piece. If desired, the user may delete at least a portion of the automatically created sewing connections after duplicating the pattern piece. By deleting one or more sewing connections, corresponding portions of the duplicated pattern piece are separated from the original pattern piece. Alternatively, the duplicated pattern piece and the original pattern piece are not automatically connected by sewing when the pattern piece is duplicated. In such case, the user may manually add sewing connections between the duplicated pattern piece and the original pattern piece after the duplicated pattern piece is created.

In some embodiments, a sewing creation or editing function may be automatically activated after the duplicated pattern piece is created. In this case, as the duplicated pattern piece is created, the user interface elements displayed in the second area 102 may be automatically switched to enable the sewing creation and editing by the user.

In one or more embodiments, only one of a user interface element for sewing creation or editing, a user interface element for editing the style line editing function, a user interface element for drawing the style line, and a user interface element for editing the length or width editing of a pattern piece may be activated at a time.

In operation 160, the simulation device may perform simulation of the design product based on the duplicated pattern piece created and its sewing connections. When the simulation function is selected through the first area 101, the simulation device may display a result of the wearing simulation in the second area 102 in 3D virtual space.

The simulation device may provide the first area 101 displaying user interface elements for editing of a design product, and second area 102 displaying the design product. In the first area 101, a user interface element 103 for design product template selection, a user interface element 104 for performing simulation, user interface elements 105 for performing various functions (e.g., a style line editing, a style line drawing, a pattern piece length or width editing, pattern piece creation, and a sewing line editing may be displayed. The simulation device may switch user interface elements displayed in the second area 102 according to the selected function the first area 101. Although the first area 101 and the second area 102 are separated in FIG. 1B, user interface elements for selecting the functions of the first area 101 may be provided in the form of an icon or menu in the second area 102 instead. For example, the first area 101 may be overlaid on the second area 102 in a transparent, translucent, or opaque manner. Alternatively, the user interface elements for selecting these functions may be displayed in the form of a pop-up menu or the like in a transparent, translucent, or opaque manner responsive to receiving a certain user input (e.g., a right-click on the second area 102) from the user. Still further, the user interface elements for activating the functions may be selected by a shortcut key.

The simulation device may perform simulation of the design product in response to selection of the user interface element 104 for the simulation function in the first area 101. The simulation function may also be activated by receiving a shortcut key from the user.

Figure 2:
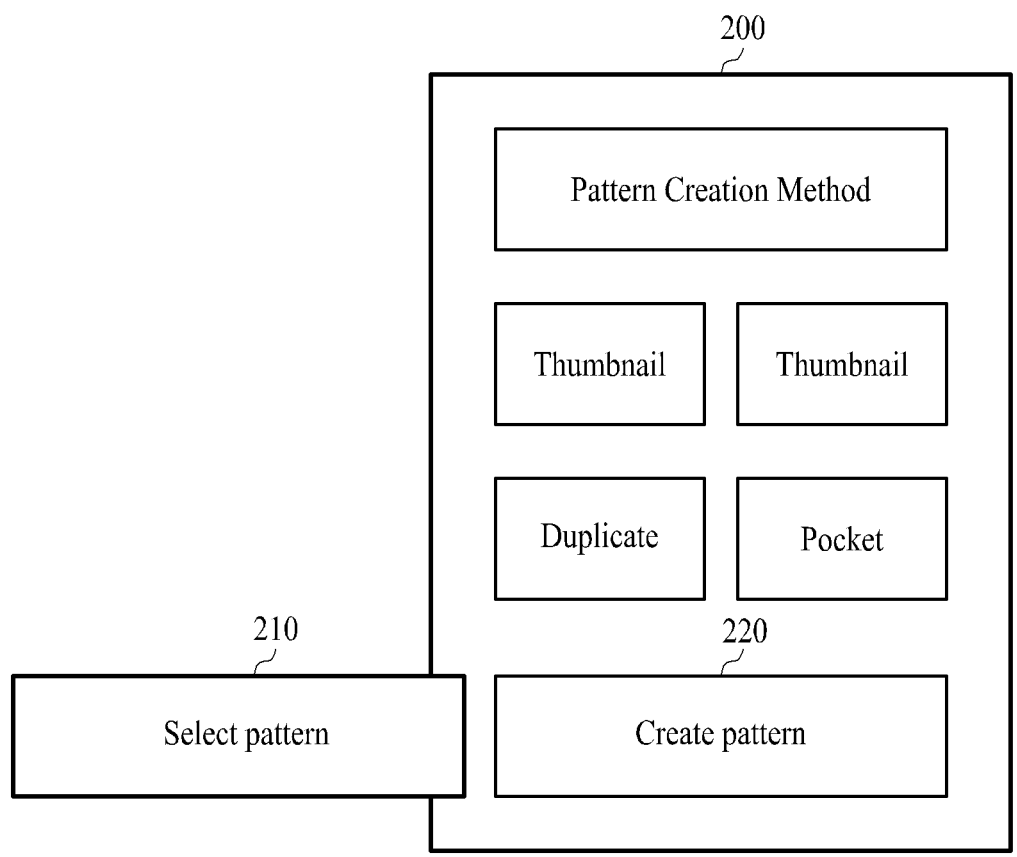
FIG. 2 is a diagram illustrating graphical user interface elements for creating or modifying a pattern piece, according to an embodiment.

FIG. 2 is a diagram illustrating graphical user interface elements for creating or modifying a pattern piece, according to an embodiment. The graphical user interface elements may include, among other elements, a pattern piece selection button 210 and a pattern creation button 220. The buttons 210, 220 may be displayed when one of the user interface elements 105 is selected from the first area 101.

An area 200 of FIG. 2 may include user interface elements for duplicating a pattern piece, creating a pocket, and extruding a style line. The duplication may be performed by selecting only an outer line of a pattern piece. In such case, only the outer line of the pattern piece is duplicated. Conversely, when a surface of the patter pieced is selected followed by activation of a user interface element indicating the duplication, the surface of the selected design product may be duplicated. Creating of the pocket involves generation of an inner line. When a pocket is created in the design product, a new style line may be drawn. The extrusion of the style line involves drawing or editing an outer line. When an outer line is selected as a style line for extruding, the outer line may be duplicated as a new style line. The extruding may shorten or lengthen the style line by a predetermined length.

The user may transform the style of a 3D garment by creating a style line on a pattern piece. For example, when a style line is created on a pattern piece, the pattern piece may be divided into two pattern pieces based on the style line followed by forming of sewing lines and a guide line in each of the pattern pieces divided based on the style line.

To perform duplication of a pattern piece, the pattern piece selection button 210 may be activated before selecting the pattern piece of the design product to be duplicated. To perform pattern creation, the pattern creation button 220 may be activated. The pattern piece selection button 210 and the pattern piece creation button may be arranged side by side in parallel with each other as shown, or the pattern piece creation button 220 may be hidden when the pattern piece selection button 210 is activated, and the pattern piece creation button 220 may appear while activate when the pattern piece selection button 210 is deactivated by selecting a pattern piece.

After the pattern piece creation button 220 is selected, a pattern piece creation completion button (not shown) may be created. For example, when the pattern piece creation completion button is selected, a sewing line identical to the selected pattern piece or a style line may be created in the duplicated pattern piece. The second area 102 may provide a result of simulating the created duplicated pattern piece.

Selecting of thumbnails in area 200 of the pattern piece may cause the simulation device to provide a result of a duplicated pattern piece to be created through a simple simulation before the pattern piece creation is completed. The thumbnail above "Duplicate" box in FIG. 2 is associated with duplicating a pattern piece while the other thumbnail above "Pocket" box in FIG. 2 is associated with creating of a pocket. While selection of user interface element 104 in FIG. 1B causes continuous displaying of simulation results after the creation of the duplicated pattern piece is completed, the selection of the thumbnail of the pattern piece creation method 200 causes displaying simulation results of only few frames or for a short amount of time.

When the pattern piece creation function is again activated by selecting the corresponding user interface in the first area 101 after a pattern piece is duplicated, the pattern piece selection button 210 may again become activated, returning to a state prior to selecting the pattern piece.

Figure 3:
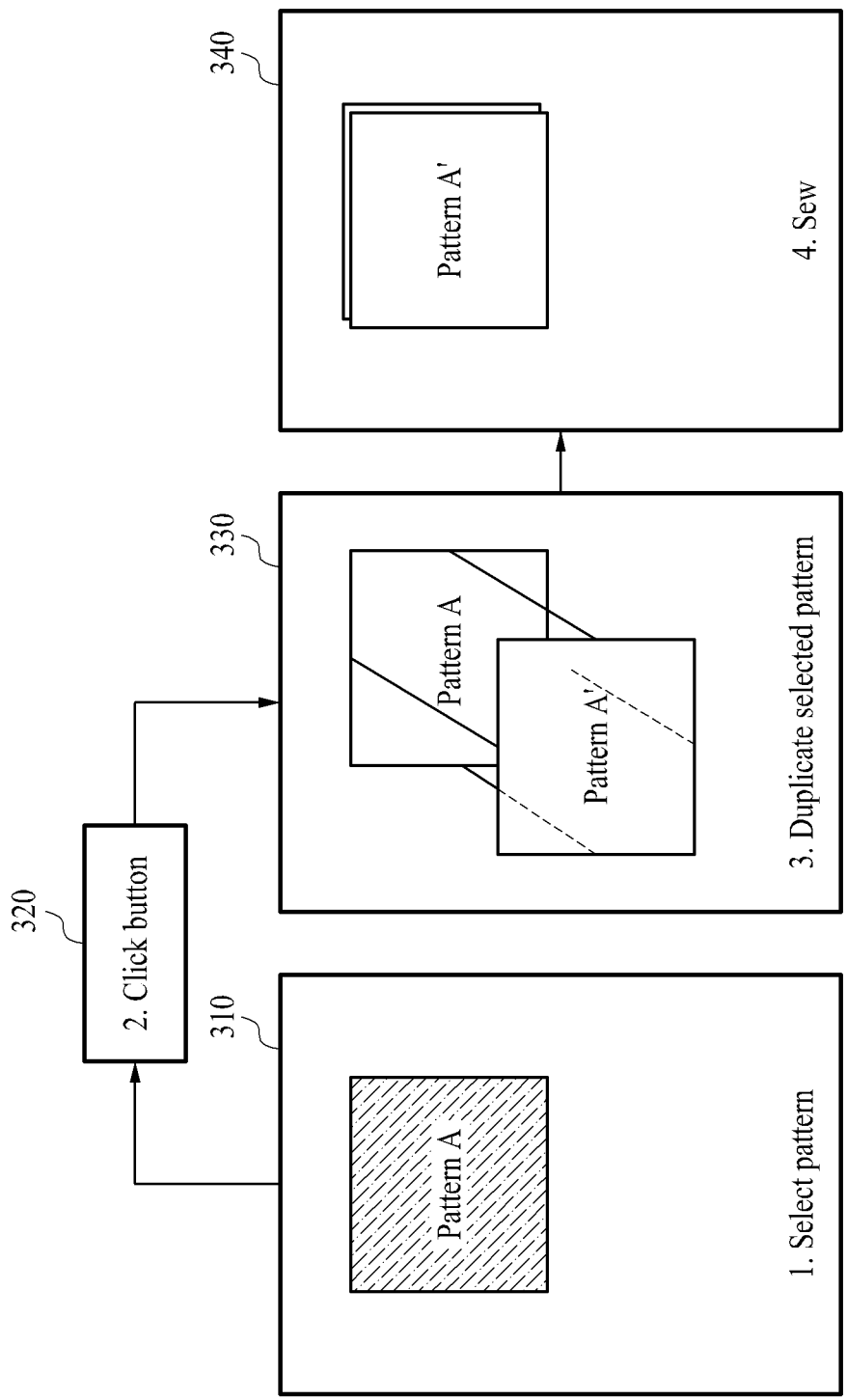
FIG. 3 is a conceptual diagram illustrating duplication of a pattern piece, according to an embodiment.

FIG. 3 is a conceptual diagram illustrating duplication of pattern piece A, according to an embodiment. In operation 310, the simulation device receives user input for selecting pattern piece A of a design product. The simulation device may differentiate selected pattern piece A over other non-selected pattern pieces by changing the color or contrast of the selected pattern piece A in response to receiving the user input.

In operation 320, the simulation device may receive an input of a pattern piece creation. When the simulation device receives the input for selecting the pattern piece A of the design product, a pattern piece creation button 220 may be displayed in the first area 101 to facilitate the user to easily create a duplicated pattern piece. In operation 330, the simulation device preforms duplication of selected pattern piece A to create duplicated pattern piece A'.

In operation 340, the simulation device may automatically connect the selected pattern piece A and duplicated pattern piece A' by sewing connections. For example, assuming that the pattern piece A is a square, its style line may be a square. In this case, the duplicated pattern piece A' may also be a square, and its style line may also be a square. The style line of pattern piece A may be an edge of pattern piece A and the style line of duplicated pattern piece A' may be an edge of duplicated pattern piece A'. The simulation device may automatically establish sewing connections between the edge of pattern piece A and the edge of duplicated pattern piece A'. That is, the simulation device may sew the style lines of pattern pieces A and A'.

Figure 4:
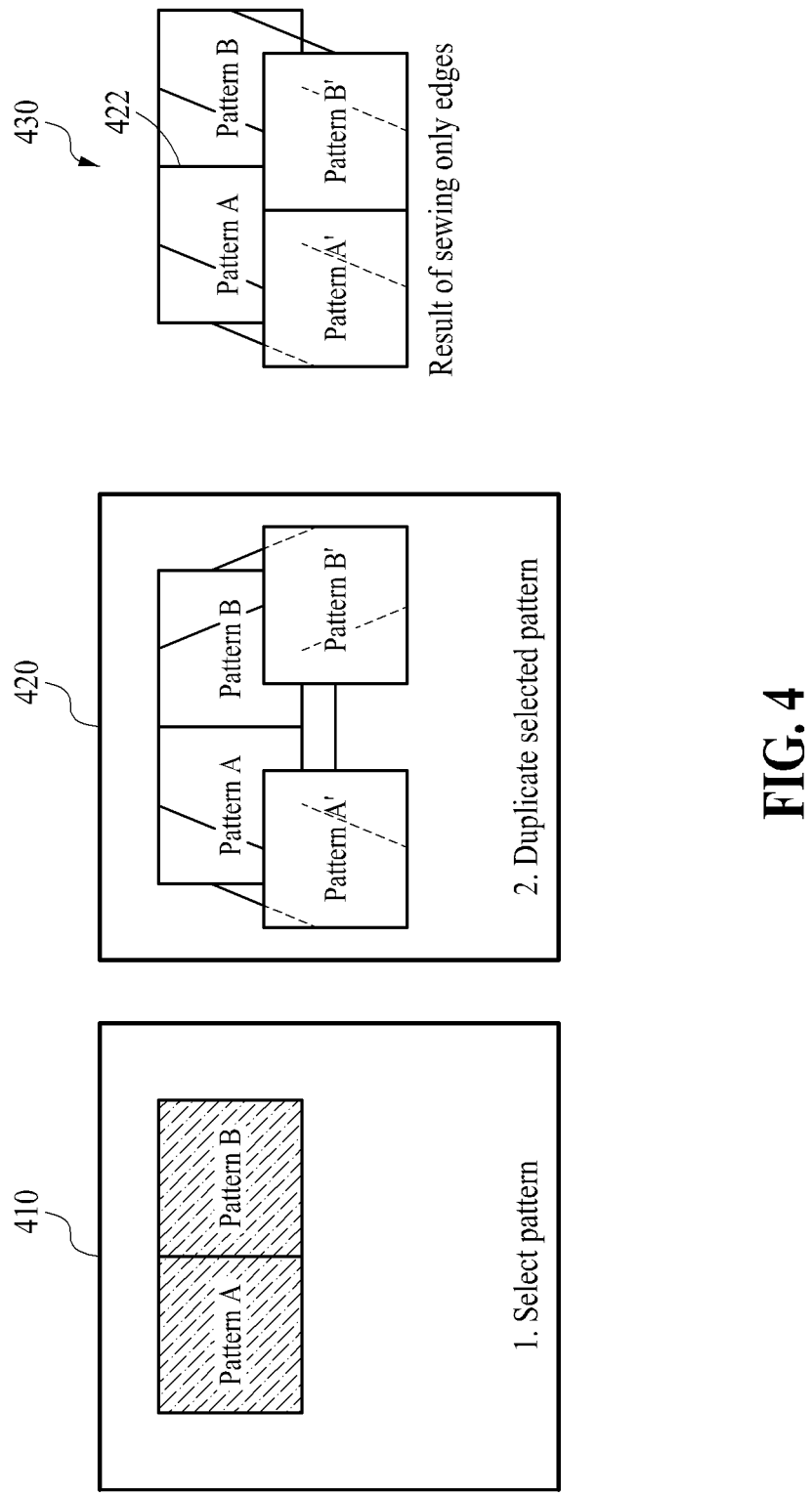
FIG. 4 is a conceptual diagram illustrating duplication of a plurality of pattern pieces, according to an example embodiment.

FIG. 4 is a conceptual diagram illustrating duplication of pattern pieces A, B, according to an example embodiment. In operation 410, a simulation device may receive an input for selecting a plurality of pattern pieces A, B. The simulation device may differentiate the selected pattern pieces A, B over other non-selected pattern pieces by changing the color or contrast of the selected pattern pieces A, B. Pattern pieces A, B are connected to each other via a shared styline 422.

In operation 420, pattern pieces A, B may be duplicated into pattern pieces A', B' in response to receiving a pattern piece creation input for selected pattern pieces A, B. In operation 430, the simulation device may exclude the shared style line 422 from an edge to which an automatic sewing connection is made. Duplicated pattern pieces A', B' also share a new style line 424 at their edges. The simulation device may determine edge portions of pattern pieces A, B excluding the style line 422 to be sewing connected. The same applies to duplicated pattern pieces A' and B', and the shared style line 424 is excluded from the edges to be sewn to pattern pieces A, B. The simulation device may establish the sewing connection between the determined edges of the pattern pieces. Despite performing of automatically establishing the sewing connections, pattern piece A, B are not merge into a single pattern piece. The same applies to duplicated pattern piece A', B' in terms of merging.

Figure 5:
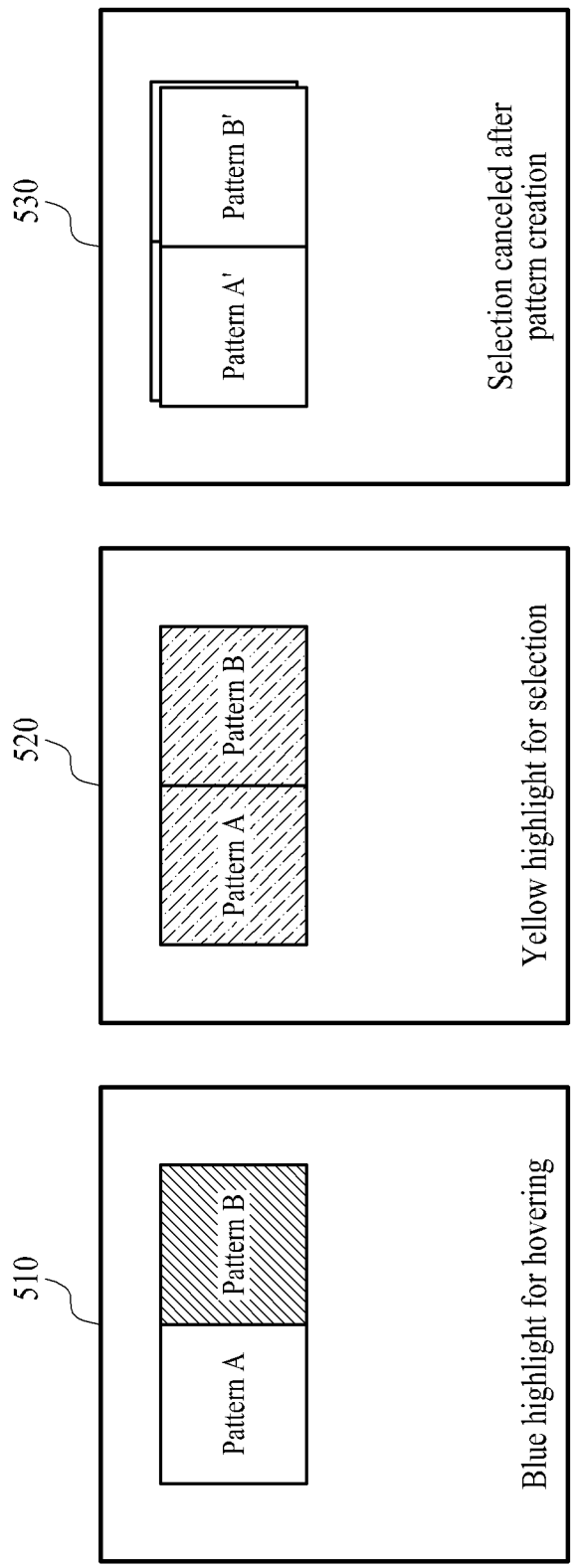
FIG. 5 is a diagram schematically illustrating selection of pattern pieces, according to an example embodiment.

FIG. 5 is a diagram schematically illustrating selection of pattern pieces, according to an example embodiment. When a pointer (e.g., a mouse cursor) hovers over a pattern, the pattern below the pointer may be highlighted (e.g., in blue) as shown by pattern B in screen 510. When the user selects the highlighted pattern piece or pieces by providing user input (e.g., clicking of mouse button), the selected pattern piece or pieces are highlighted in another color (e.g., yellow) as shown in screen 520. The simulation device may also indicate that the pattern piece of pieces were created, and the selection is now canceled by removing the highlighted color as shown in screen 530.

Figure 6:
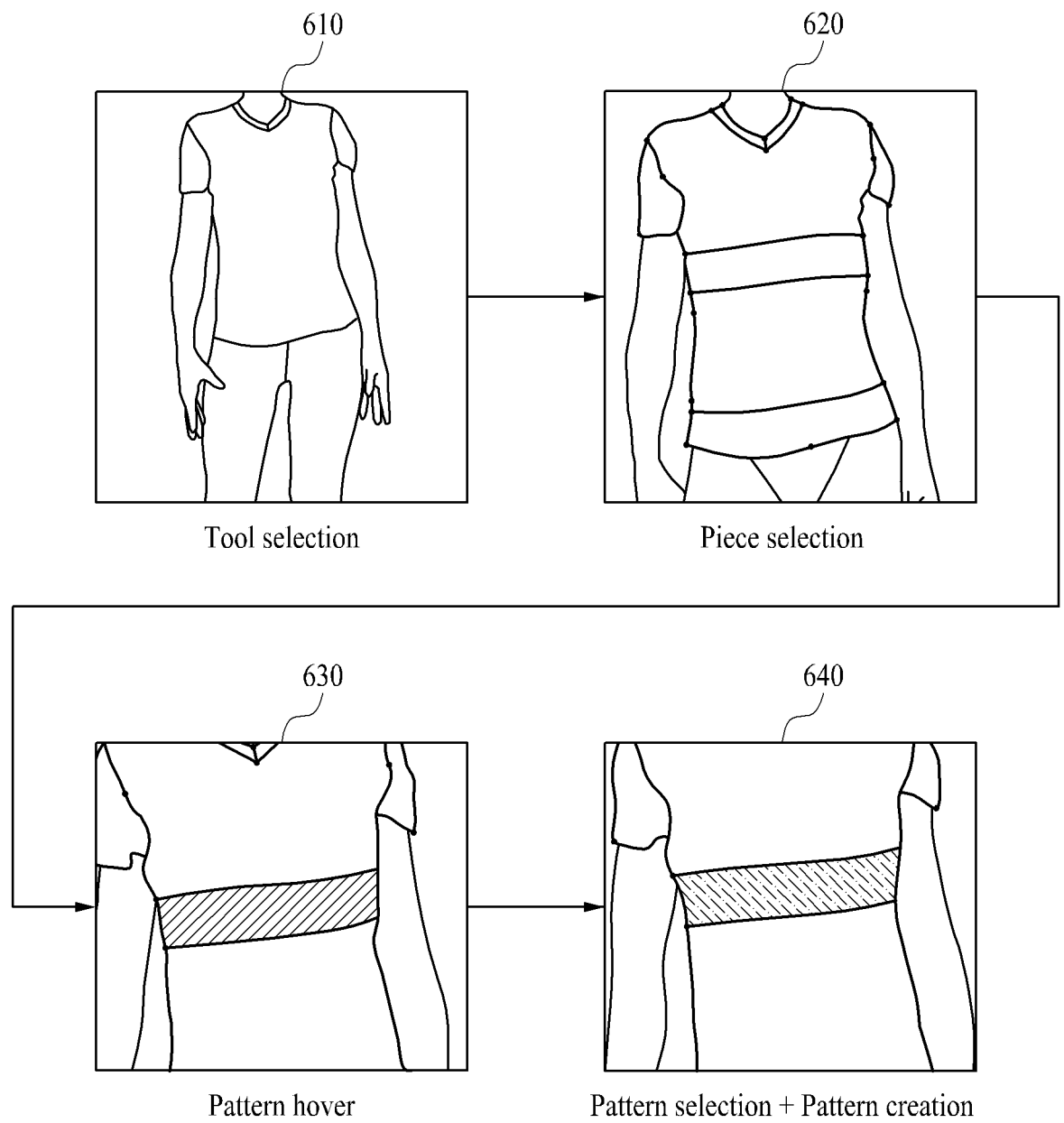
FIG. 6 is a diagram illustrating navigating through depth levels to perform a pattern piece creation operation, according to an embodiment.

FIG. 6 is a diagram illustrating navigating through depth levels to perform a pattern piece creation operation, according to an embodiment. An avatar may or may not be displayed in a 3D simulation. When the avatar is not displayed, only design products (e.g., pattern pieces) are displayed.

A simulation device may display contents in the second area 102 according to a depth level. For example, all garments may be expressed at a 0th depth level, all pattern pieces in a selected garment may be expressed at a first depth level and/pr a second depth level.

At 0th depth level, a portion of screen 610 displays the entire set of garments (e.g., a shirts and pants). At the first depth level, a portion of screen 620 displays only a selected piece of garment (e.g., a shirt) while unselected piece of garment (e.g., pants) are not shown. The first depth level may allow the entire 3D garment to be modified. For this purpose, a graphical user interface for editing the entire 3D garment may be displayed. For example, the example of FIG. 6 shows a set of 3D garments composed of two pieces, a shirt and pants, where shirt is selected by the user in the first depth level. The simulation device may display a user interface that allows overall modification of the selected shirt, and make the unselected pants transparent or translucent at the first depth level.

At the second depth level, as shown in screen 630, pattern pieces of the garment piece selected in the first depth level are shown. When a pointer hovers over and selects a pattern piece as shown in a portion of screen 630, the selected pattern piece may be highline. At the second depth level, an individual pattern piece selected by the user may be modified and the modification to the entire garment may be confined to the changes that occur due to the modification in the individual pattern piece. After the selection, the selected pattern piece may be duplicated as shown in a portion of screen 640. As a non-limiting example, a selected piece and style lines included in the selected pattern piece may also be displayed at the first depth level.

The simulation device may display the design product in a 3D virtual space in the second area 102 at the 0th depth level (e.g., 610). The simulation device may display at least one of the garment and its style line in a 3D virtual space at the first depth level (e.g., 620). The portion of screen 620 may be displayed when a pattern piece creation bottom is activated.

The displayed portion of garments and their pattern pieces may differ according to the selection of the pattern pieces. For example, the simulation device may display a pattern piece on which a pointer hovers over in the portion of screen 630 (at the first depth level) as highlighted in blue color. In addition, the simulation device may display the selected and created pattern piece in the portion of screen 640 at the first depth level highlighted in yellow color.

The simulation device may unselect the currently selected piece when a selection input is received at empty space where no avatar or design product is displayed in the second area 102. Also, when the simulation device receives an Undo command, the simulation device may cancel the selection. When a selection input is received at empty space where no pattern piece is present, the simulation device may return to the 0th depth level (e.g., 610).

FIGS. 7A through 9B are diagrams illustrating modifying or adding of a style line of a collar part, according to an embodiment. A simulation device may load a design product onto an avatar (e.g., an avatar of FIGS. 7A to 10B) displayed in the second area 102 in response to making selection at design product template selection area 103 in the first area 101. The design product template selection area may display various design products including pieces of clothing (e.g., skirts, pants, T-shirts, and hoodies). The simulation device may don a shirt of a certain design and pants of a certain design onto the avatar by making the selection of the shirt and pants in design product template area 103. In some embodiments, the simulation device may perform wearing simulation of each template in advance and the result of the pre-simulated result may be loaded with the selected garment.

Figure 7A:
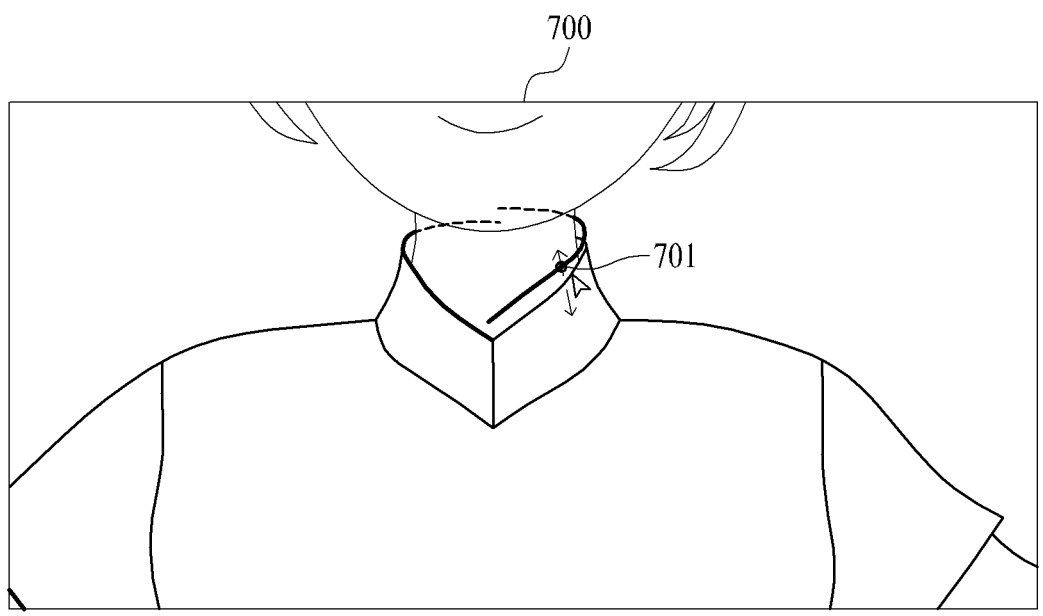
FIGS. 7A through 9B are diagrams illustrating modifying or adding of a style line of a collar part, according to an embodiment.
Figure 7B:
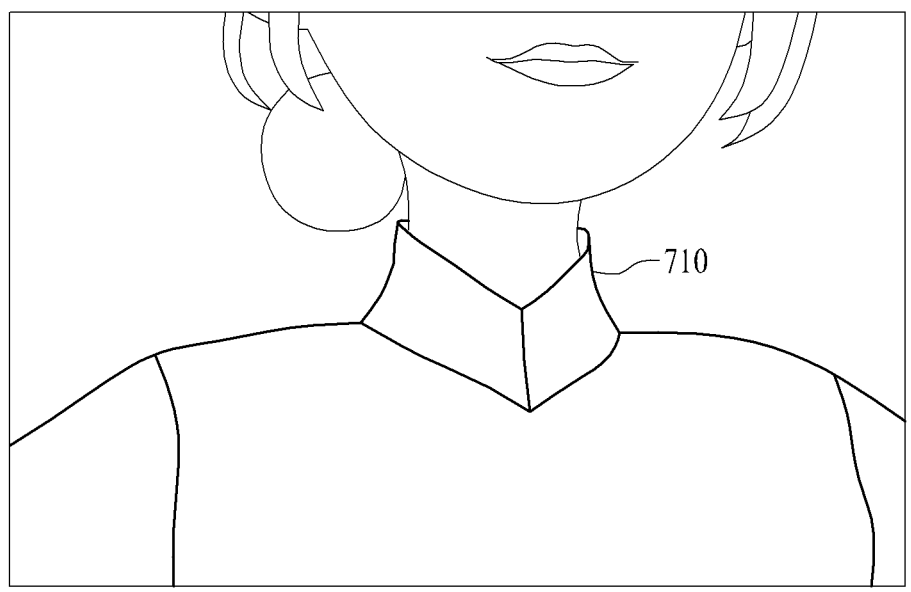

Referring to FIG. 7A, the simulation device displays, in the second area 102, a shirt when a user interface element for editing pattern piece length or width is selected from the first area 101. The simulation device displays style lines of the top piece in the second area 102. When the simulation device receives command 701 for editing a length of a style line of a collar part in the top piece, the simulation device may provide simulation 710 of FIG. 7B for editing the pattern piece length of the collar part. The simulation device may apply symmetrical editing to equally edit a pattern piece length of a collar part symmetrically opposite to the selected collar part. Such symmetrical editing may be enabled or disabled by the user's choice.

Figure 8A:
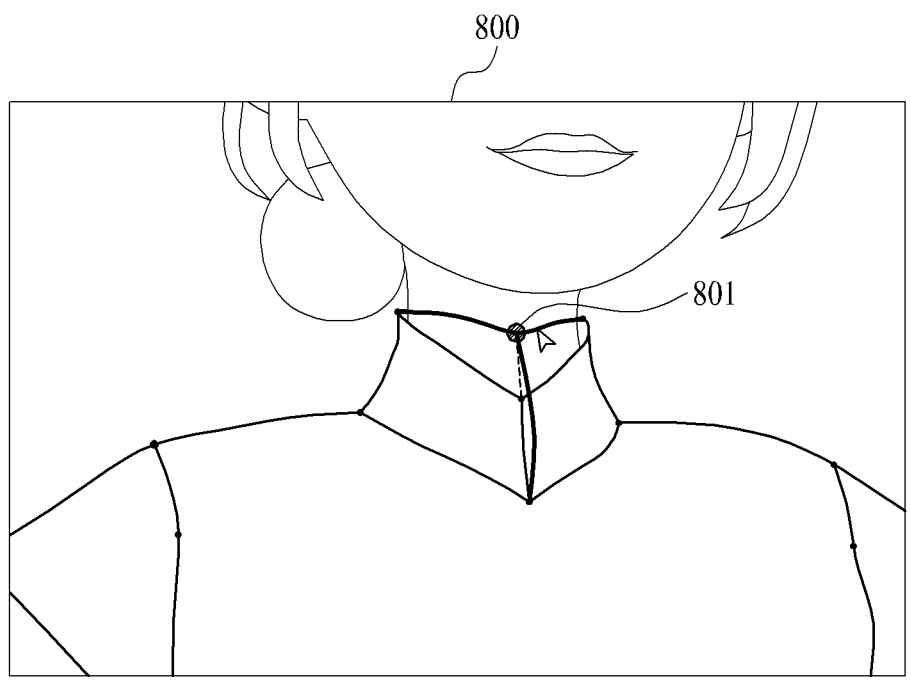
Figure 8B:
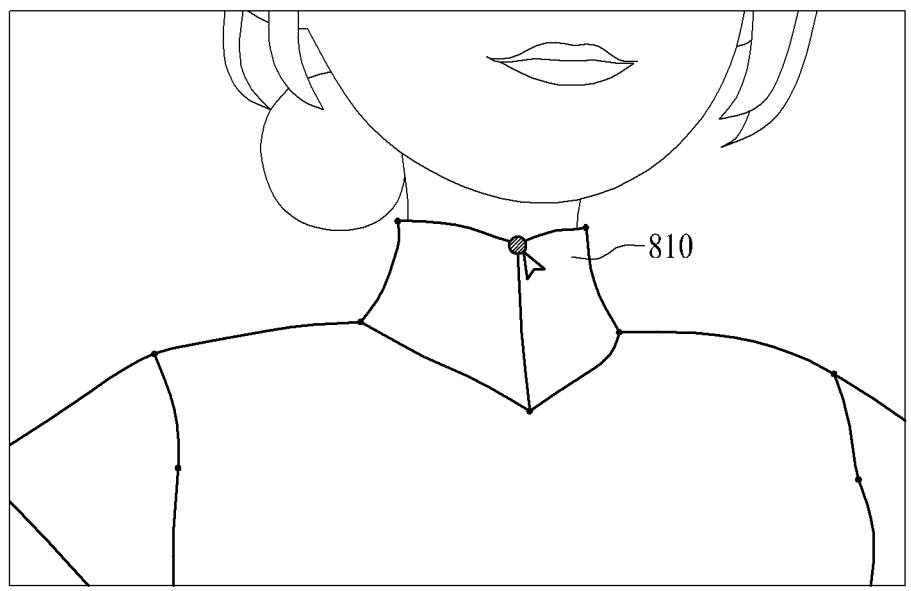

FIGS. 8A and 8B are diagrams schematically illustrating a style line editing being performed in the second area 102 when a corresponding user element is selected from user interface elements 105. For example, when a user interface for the style line editing is activated and the the top piece is selected, the simulation device may provide styles line of the top piece in the second area 102. When the simulation device receives a command at point 801 for editing a style line of a collar part, the simulation device may provide a simulation (e.g., 810) for editing the style line of the collar part. The simulation device may extend or contract the style line by adjusting the location of point 801.

When the simulation device receives a command for extending a length of the style line of the collar part represented by manipulating point 801 in a portion of screen 800, the simulation device may display the result of simulation 810 in accordance with the length of the style line of the collar part extended in the portion of screen 800. When there is a symmetrically opposite collar part, the simulation device may apply symmetrical editing to equally apply the length adjusted to the symmetrically opposite collar part. Such symmetrical editing may be enabled or disabled by the user's choice.

Figure 9A:
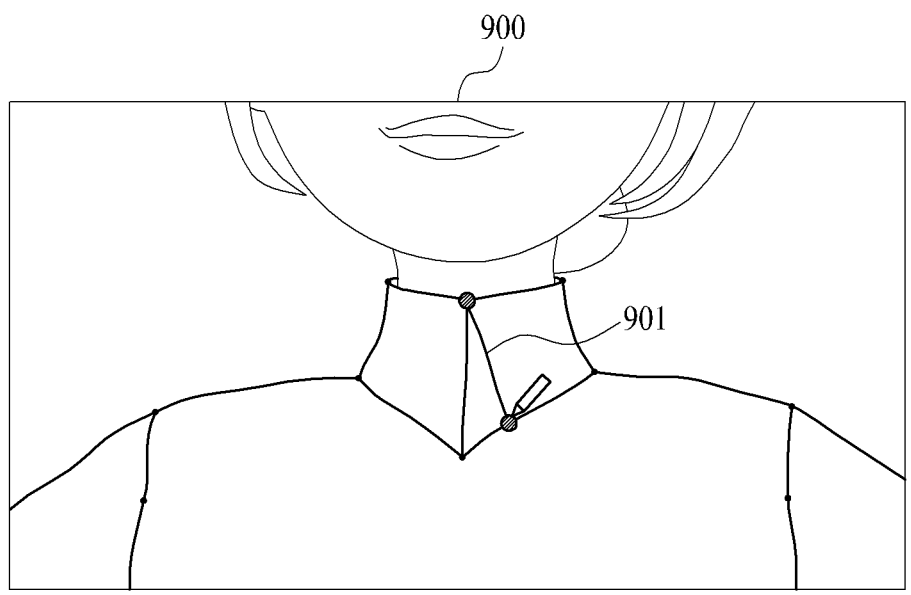
Figure 9B:
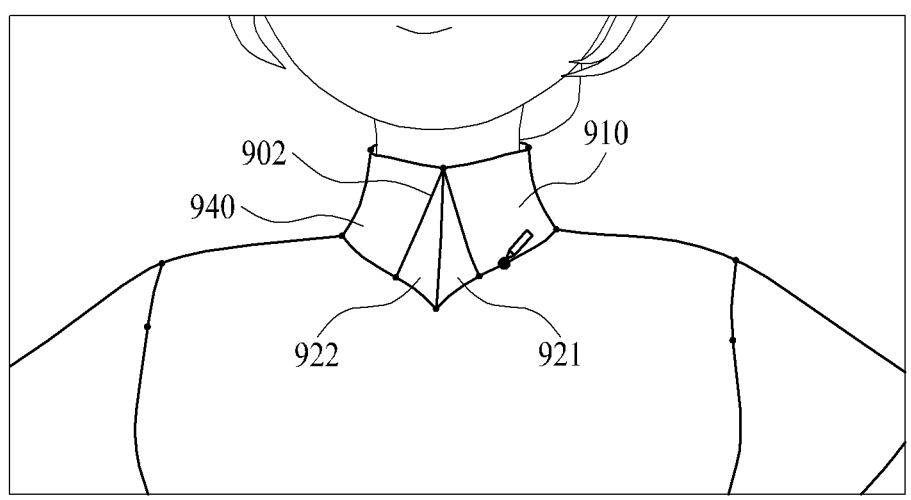

FIGS. 9A and 9B are diagrams schematically illustrating drawing of a style line when a corresponding user interface element is selected in the first area 101. The simulation device displays style lines of in the top piece. When the simulation device receives a command for drawing a style line 901 on a collar part of the top piece, the simulation device displays the added the style line 901. In addition, the simulation device may create a style line 902 on the collar part that is symmetrically opposite to the selected collar part as shown in FIG. 9B. The simulation device may divide pattern pieces according to the added style lines and automatically add sewing connections between the divided pattern pieces. In the example of FIGS. 9A and 9B, the original pattern pieces of the collar part may be divided into a first pattern piece 910, a second pattern piece 940, a third pattern piece 921, a fourth pattern piece 922, and a fifth pattern piece (930 of FIG. 10A). Such symmetrical editing may be enabled or disabled by the user's choice.

Figure 10A:
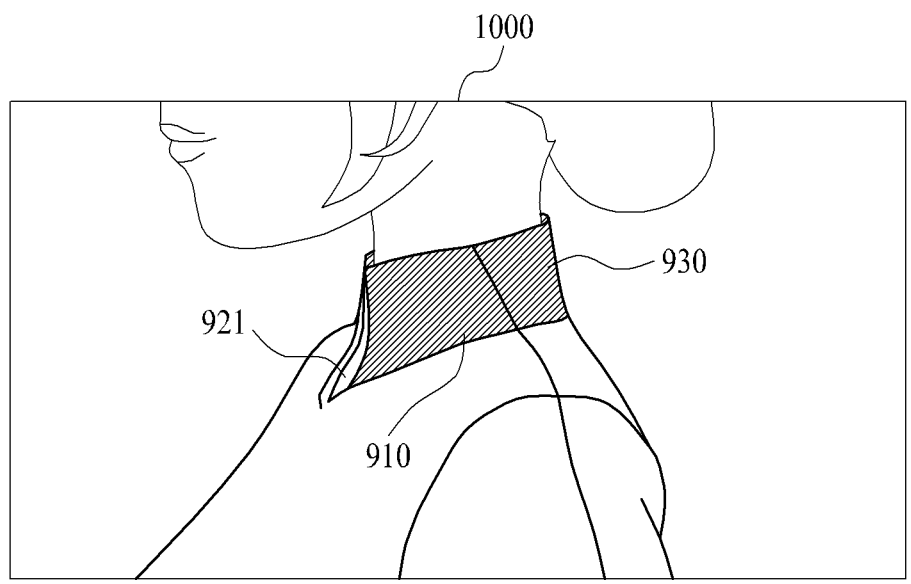
FIGS. 10A and 10B are diagrams illustrating pattern pieces of a collar portion created through duplication, according to an embodiment.
Figure 10B:
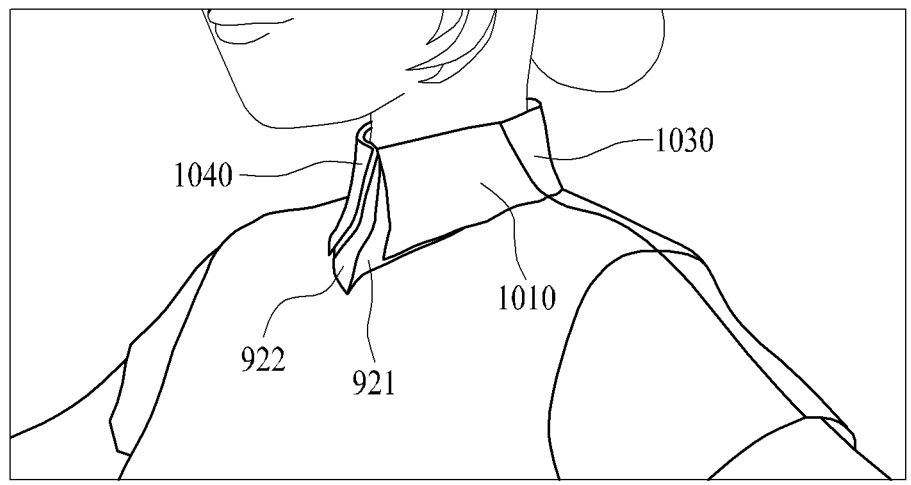

FIGS. 10A and 10B are diagrams illustrating pattern pieces of a collar portion created through duplication, according to an embodiment. The simulation device displays a portion of the screen 1000 in the second area 102 in response to selection of a pattern piece creation user interface element in the first area 101. The screen 100 enables a pattern piece to be selected as described above with reference to FIGS. 2 through 6.

When the simulation device receives a selection input for the first pattern piece 910, the second pattern piece 940, and the third pattern piece 930 after the pattern piece creation user interface element is selected, the simulation device may highlight style lines of the top piece and the selected pattern pieces 910, 940, and 930 in the portion of the screen 1000. When the simulation device receives a pattern piece creation command for the selected pattern pieces 910, 940, and 930, duplicated pattern pieces 1010, 1040, and 1030 may be created. According to example embodiments, the simulation device may add sewing connections based on the style lines of the duplicated pattern pieces. As described in FIGS. 4 and 5, the simulation device may establish sewing connections at the edges of the selected pattern piece areas 910, 930, and 940 and the edges of the duplicated pattern piece areas 1010, 1030, and 1040.

FIGS. 11A through 11D are exploded view of the collar portion, according to an example embodiment. The simulation device may generate an exploded view 1100 in response to selection of a user interface element corresponding to a sewing creation or editing function in the first area 101. The simulation device may display the collar portion in exploded view 1100 at intermediate depth level where specific details of the garment may be edited. The intermediate depth level may be a level between the first depth level and the second depth level described above with reference to FIG. 6. Pattern pieces may be displayed on the screen at the intermediate depth level to enable editing of sewing connections between the pattern pieces. The simulation device may display a user interface for editing a garment (e.g., a top piece) selected by a user and but not display a user interface for an unselected garment piece (e.g., a bottom piece).

FIGS. 11A to 11D show sewing lines representing sewing connections of pattern pieces in a collar part of a top piece at the intermediate depth level. The sewing connections extend between edges of the pattern pieces that are to be sewn together. The simulation device may increase distances between pattern pieces in an exploded view. For example, the simulation device may increase distances between the first duplicated pattern piece 1010, the second duplicated pattern piece 1040, and the fifth duplicated pattern piece 1030, and the first pattern piece 910, the second pattern piece 940, and the fifth pattern piece 930, respectively. In this way, the simulation device visualizes a design product (e.g., a collar of a top in FIGS. 11A and 11B) through a 3D exploded view, so that the user may conveniently select and edit a sewing line related to a pattern piece that the user has determined to edit.

Figure 11A:
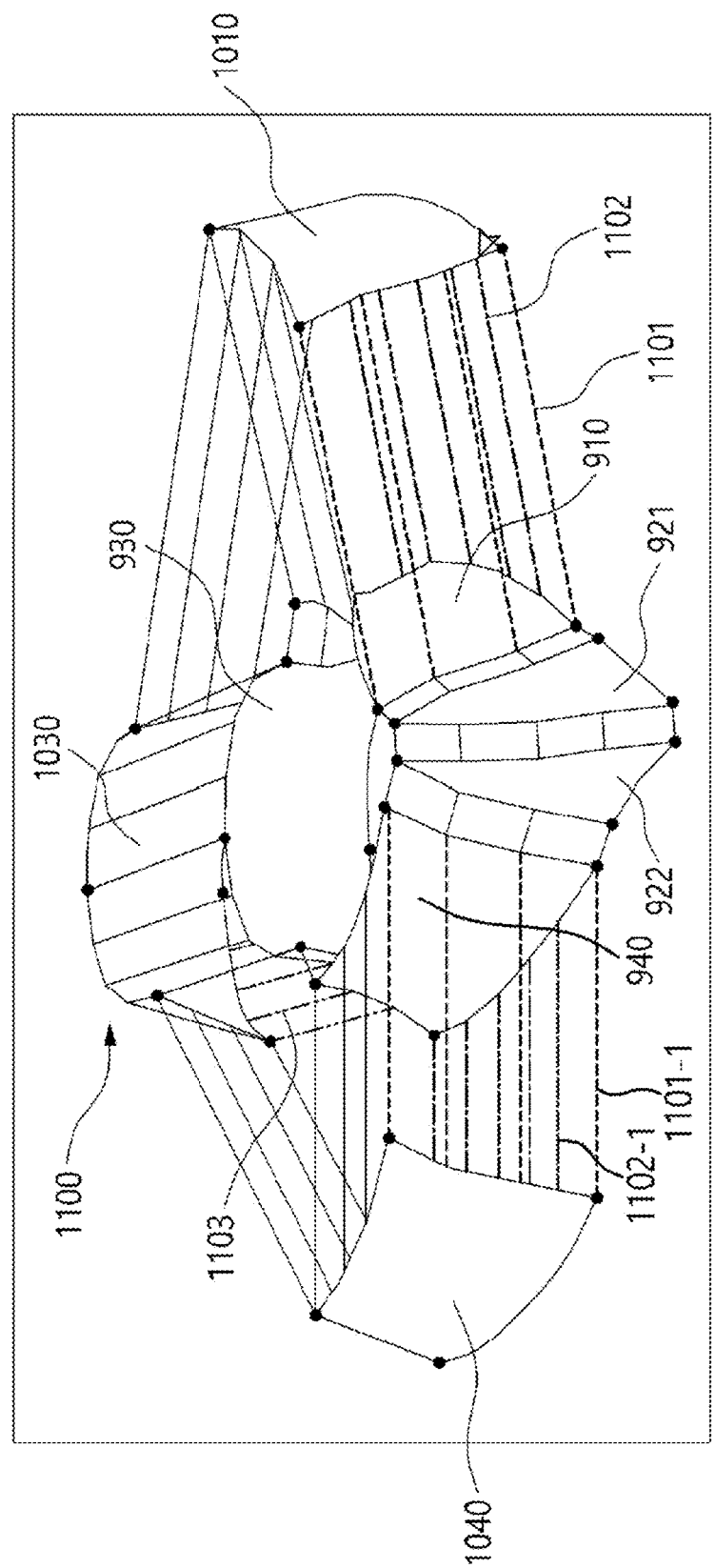
FIGS. 11A through 11D are exploded view of the collar portion, according to an example embodiment.

In FIGS. 11A to 11D, all pattern pieces in a T-shirt are shown with the distance increased. Referring to FIG. 11A, the simulation device may automatically create sewing connections between the duplicated pattern pieces 1010, 1030, and 1040 and existing pattern pieces 910, 930, and 940 by selecting the pattern piece creation function. For example, the simulation device may connect a portion excluding the style lines shared by the first pattern piece 910, the second pattern piece 940, and the fifth pattern piece 930, to the second duplicated pattern piece 1040, and the fifth duplicated pattern piece 1030 with a sewing line. However, the style lines shared by the first duplicated pattern piece 1010 are not connected to other pattern pieces. Specifically, the simulation device may connect a first upper sewing line, a first side sewing line 1101, and a first lower sewing line 1102 between the first pattern piece 910 and the first duplicated pattern piece. The simulation device may connect a second upper sewing line, a second side sewing line 1101-1, and a second lower sewing line 1101-2 between the second pattern piece 940 and the second duplicated pattern piece 1040. The simulation device may connect a fifth upper sewing line and a fifth lower sewing line 1103 between the fifth pattern piece 930 and the fifth duplicated pattern piece 1030.

Figure 11B:
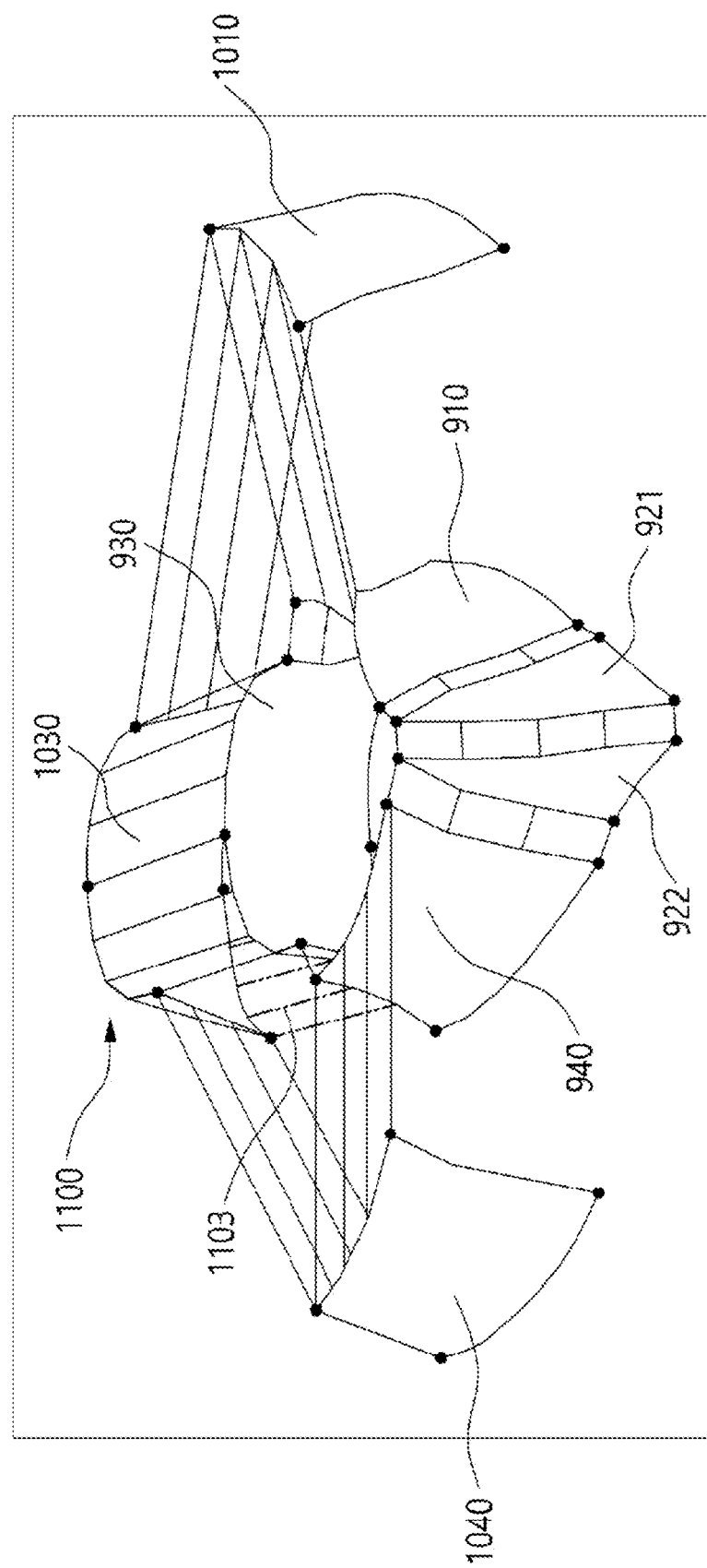

Referring to FIG. 11B, the simulation device creates or edits sewing connections between selected pattern pieces and duplicated pattern pieces in response to selection of a user interface element corresponding to a sewing creation or editing function. For example, a user may input a command selecting and deleting the first side sewing lines 1101, the first lower sewing lines 1102, the second side sewing lines 1101-1, and the second lower sewing lines 1102-1 in exploded view 1100. The user may edit the sewing connections by selecting the sewing lines to be deleted by providing a command. Alternatively, although not shown in the drawings, the user may create sewing connection by adding sewing lines in the exploded view 1100. When the sewing connection is created and/or edited, the simulation device may simulate garment with the updated sewing connection in the second area 102.

Figure 11C:
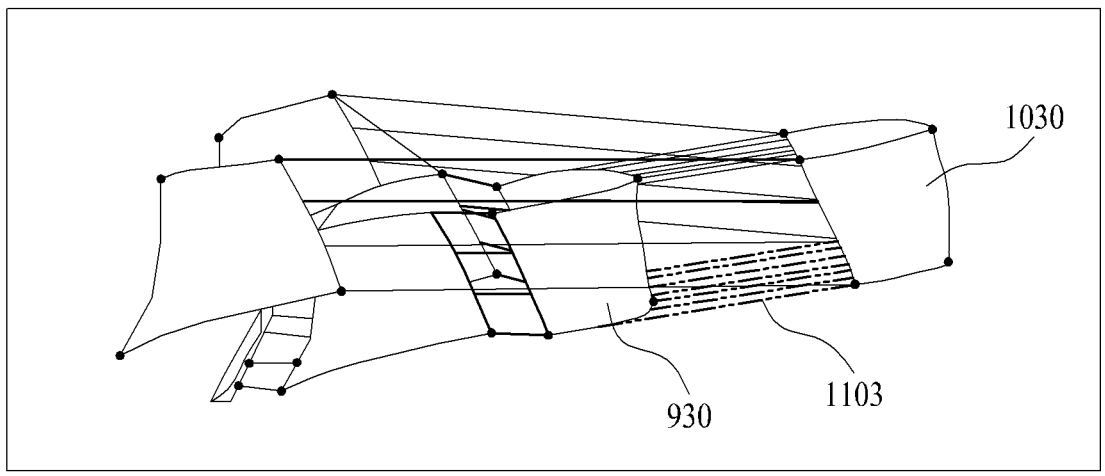
Figure 11D:
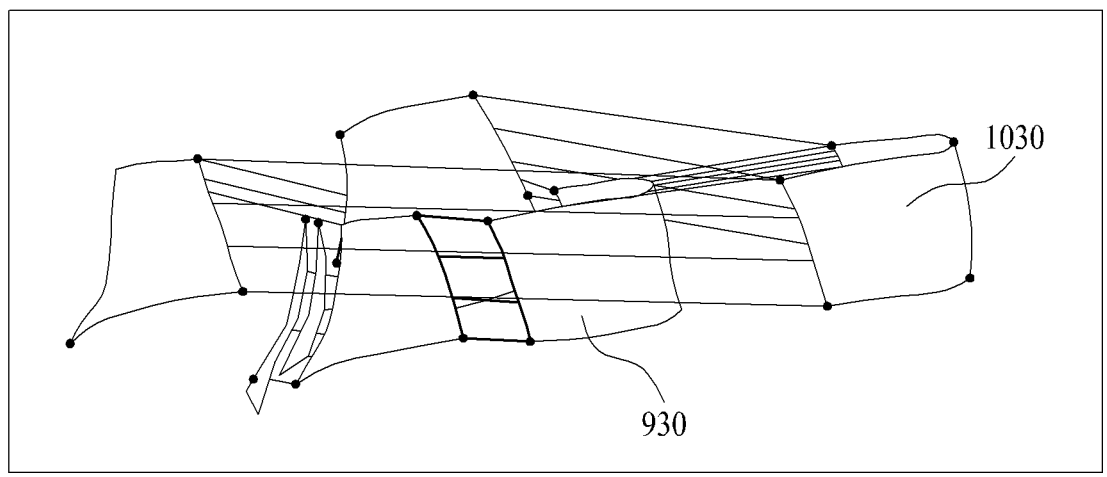

Referring to FIGS. 11C and 11D, the simulation device may display a side of a design product by rotation the design product in 3D virtual space. As shown in FIGS. 11C and 11D, the simulation device may display sewing lines from a side of the design product. The user may create or edit sewing connections by manipulating sewing lines in FIG. 11C. For example, the simulation device may delete sewing lines 1103 based on a sewing editing command received from the user.

Although not shown in the drawings, the simulation device may link the edited or duplicated pattern piece in the 3D virtual space, according to the process described in FIGS. 7A to 11D to a 2D pattern piece. The simulation device may reflect a length or width of the 3D pattern piece, editing and addition of a style line of the 3D pattern piece, and editing of sewing connections of the 3D pattern pieces to the corresponding 2D pattern piece.

Embodiments enable users to intuitively and easily create and/or modify the design of a design product (e.g., garment) by selecting pattern pieces and taking actions on the selected pattern pieces in 3D editing space instead of modifying the pattern pieces in 2D space. Users not familiar with traditional garment designing processes that involve editing of 2D pattern pieces may easily create and modify the design product by manipulating the pattern pieces in 3D space. Further, the automatic generation of sewing connections between selected pattern pieces and duplicated pattern pieces further enable more expedient designing of design products. Adding and editing of style lines also enable more intuitive and expedient designing.

The example embodiments described herein may be implemented using hardware components, software components and/or combinations thereof. For example, the devices, methods, and components described in the example embodiments may be implemented using general-purpose or special-purpose computers, such as, for example, a processor, a controller and an arithmetic logic unit (ALU), a digital signal processor (DSP), a microcomputer, a field-programmable gate array (FPGA), a programmable logic unit (PLU), a microprocessor, or any other device capable of responding to and executing instructions in a defined manner. A processing device may run an operating system (OS) and software applications that run on the OS. The processing device also may access, store, manipulate, process, and create data in response to execution of the software. For purpose of simplicity, the description of a processing device is singular; however, one skilled in the art will appreciate that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or combinations thereof, to independently or collectively instruct or configure the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored in a non-transitory computer-readable recording medium.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter.

Figure 12:
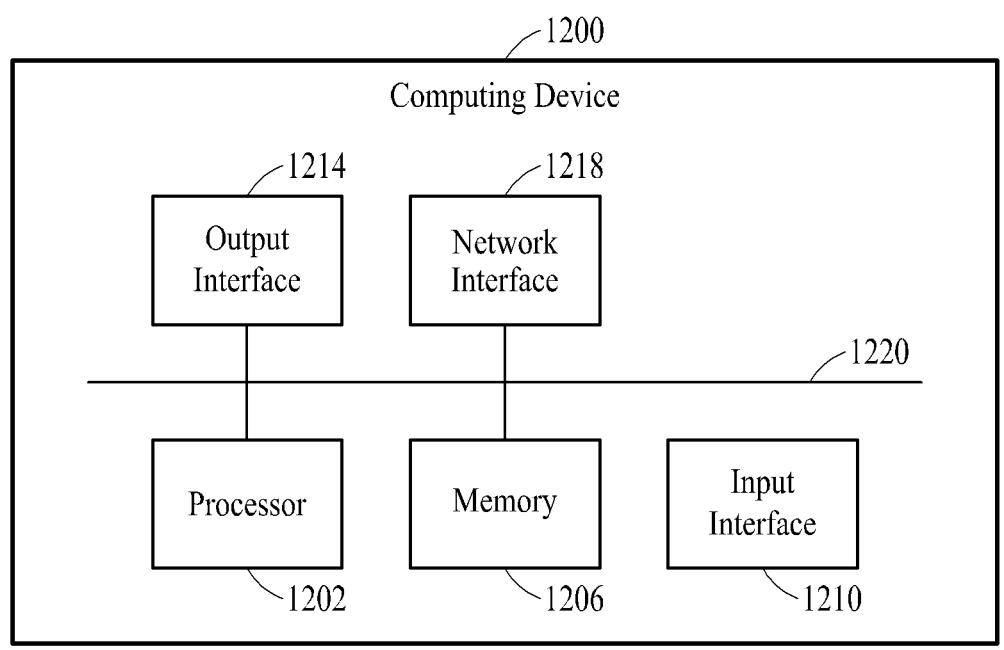
FIG. 12 is a block diagram of a computing device, according to embodiments.

FIG. 12 is a block diagram of a computing device 1200 for implementing the simulation device, according to embodiments. The computing device 1200 may include, among other components, a processor 1202, a memory 1206, an input interface 1210, an output interface 1214, a network interface 1218, and a bus 1220 connecting these components. The processor 1202 retrieves and executes commands stored in memory 1206. The memory 1206 store software components including, for example, operating systems and modules for instantiating and executing functions of the simulation device as described herein. The input interface 1210 receives data from external sources such as user inputs. The output interface 1214 is a component for providing the result of computation in various forms (e.g., graphical user interface). The network interface 1218 enables the computing device 1200 to communicate with other computing devices by a network. Some portions of functions described herein may be performed on other computing devices located remote from the computing device 1200, and the information associated with the designing or result of simulation may be communicated between the computing devices via the network interface 1218.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A method of designing garment, comprising:
displaying a garment including a plurality of pattern pieces in three-dimensional (3D) virtual space;
receiving selection of a pattern piece of the plurality pattern pieces in the three-dimensional virtual space;
duplicating the selected pattern piece responsive to receiving the selection of the pattern piece;
automatically setting sewing connections between the duplicated pattern piece and the selected pattern piece;
receiving an input updating a subset of the sewing connections to generate an updated garment including the duplicated pattern piece connected to the selected pattern piece; and
performing simulation of the updated garment in the three-dimensional virtual space.

2. The method of claim 1, further comprising:
displaying sewing lines extending between an edge of the selected pattern piece to an edge of the duplicated pattern piece to represent the sewing connections.

3. The method of claim 1, further comprising:
receiving selection of another pattern piece sharing a style line with the selected pattern piece, the style line representing a style, a silhouette or both the style and the silhouette of the garment, wherein sewing lines do not extend between the selected pattern piece and the other selected pattern piece.

4. The method of claim 1, further comprising receiving a drawing input to draw a style line across at least one of the plurality of pattern pieces, the style line representing a style, a silhouette or both the style and the silhouette of the garment.

5. The method of claim 4, further comprising automatically adding another style line that is symmetrical to the drawn style line, the other style line extending across at least another of the plurality of pattern pieces.

6. The method of claim 1, further comprising:
displaying a style line representing a style, a silhouette or both the style and the silhouette of the garment in the three-dimensional virtual space; and
receiving an editing input to modify the displayed style line, wherein the updated garment is modified according to the modified style line.

7. The method of claim 1, further comprising displaying user interface elements for selecting functions to be performed on the garment or the updated garment in a first area, and displaying the garment in a second area separate from the first area.

8. The method of claim 7, wherein the user interface elements include at least a first user interface element activating a drawing function for adding a style line in the garment, a second user interface element for editing a length or width of a pattern piece of the garment, and a third user interface element editing a style line in the garment.

9. The method of claim 8, wherein one of the first interface element, the second user interface element and the third user interface element is activated at a time.

10. The method of claim 1, wherein duplicating the selected pattern piece comprises:
identifying a two-dimensional (2D) pattern piece corresponding to the selected pattern piece; and
generating a 2D duplicated pattern piece corresponding to the selected pattern piece based on the identified two-dimensional pattern piece.

11. The method of claim 10, wherein generating the 2D duplicated pattern piece comprises generating new sewing connections between the identified two-dimensional pattern piece and the 2D duplicated pattern piece.

12. The method of claim 1, further comprising:
displaying the plurality of pattern pieces and the duplicated pattern piece in an exploded view, wherein the sewing connections are represented as sewing lines between edges of the plurality of pattern pieces and the duplicated pattern piece.

13. The method of claim 12, wherein the input updating the subset of the sewing connections is received at sewing lines representing the subset of sewing connections.

14. The method of claim 13, wherein the input updating the subset of sewing connections indicates editing of the sewing lines representing the subset of sewing connections.

15. A non-transitory computer-readable storage medium storing instructions thereon, the instructions when executed by a processor cause the processor to:
display a garment including a plurality of pattern pieces in three-dimensional (3D) virtual space;
receive selection of a pattern piece of the plurality pattern pieces in the three-dimensional virtual space;
duplicating the selected pattern piece responsive to receiving the selection of the pattern piece;
automatically set sewing connections between the duplicated pattern piece and the selected pattern piece;
receive an input updating a subset of the sewing connections to generate an updated garment including the duplicated pattern piece connected to the selected pattern piece; and
perform simulation of the updated garment in the three-dimensional virtual space.

16. A computing device, comprising:
a processor; and
memory storing instruction that cause the processor to:
display a garment including a plurality of pattern pieces in three-dimensional (3D) virtual space,
receive selection of a pattern piece of the plurality pattern pieces in the three-dimensional virtual space,
duplicate the selected pattern piece responsive to receiving the selection of the pattern piece,
automatically set sewing connections between the duplicated pattern piece and the selected pattern piece,
receive an input updating a subset of the sewing connections to generate an updated garment including the duplicated pattern piece connected to the selected pattern piece, and
perform simulation of the updated garment in the three-dimensional virtual space.

* * * * *